United States Patent

Urano

[15] 3,659,508
[45] May 2, 1972

[54] FLASH-SYNCHRONIZING ASSEMBLY FOR CAMERAS

[72] Inventor: Fumio Urano, Tokyo, Japan

[73] Assignee: Asahi Kogaku Kogyo Kabushiki Kaisha, Tokyo-to, Japan

[22] Filed: May 13, 1970

[30] Foreign Application Priority Data

June 10, 1969 Japan..................................44/53769

[52] U.S. Cl. ...........................................................95/11.5 R
[51] Int. Cl. ...............................................................G03b 9/70
[58] Field of Search......................................................95/11.5

[56] References Cited

UNITED STATES PATENTS

| | | | |
|---|---|---|---|
| 2,664,796 | 6/1954 | Stein et al. | 95/11.5 |
| 2,643,597 | 6/1953 | Suzukawa | 95/11.5 |
| 2,552,213 | 5/1951 | Pribus et al. | 95/11.5 |

Primary Examiner—Samuel S. Matthews
Assistant Examiner—Michael L. Gellner
Attorney—Steinberg & Blake

[57] ABSTRACT

A flash-synchronizing assembly for cameras, enabling the instant of flash ignition to be selected according to the type of flash and the shutter speed. A pair of coaxial cams are provided to be selectively positioned angularly respectively according to positions corresponding to the type of flash and to the shutter speed. A cam follower is swingable on a rod carried by a swing-lever which turns about a given axis. This cam follower engages both of the cams to determine from the latter the angular position of the swing-lever, so that this latter position will be in accordance with the selected combination of flash type and shutter speed. A normally stationary contact of a flash circuit is carried by the swing-lever to be positioned as a location determined by the combined positions of the cams. A movable contact is released, upon initiation of an exposure, for movement into engagment with the normally stationary contact so as to bring about closing of the flash circuit at an instant which will be best for the particular type of flash and shutter speed which have been selected.

2 Claims, 5 Drawing Figures

Patented May 2, 1972 3,659,508
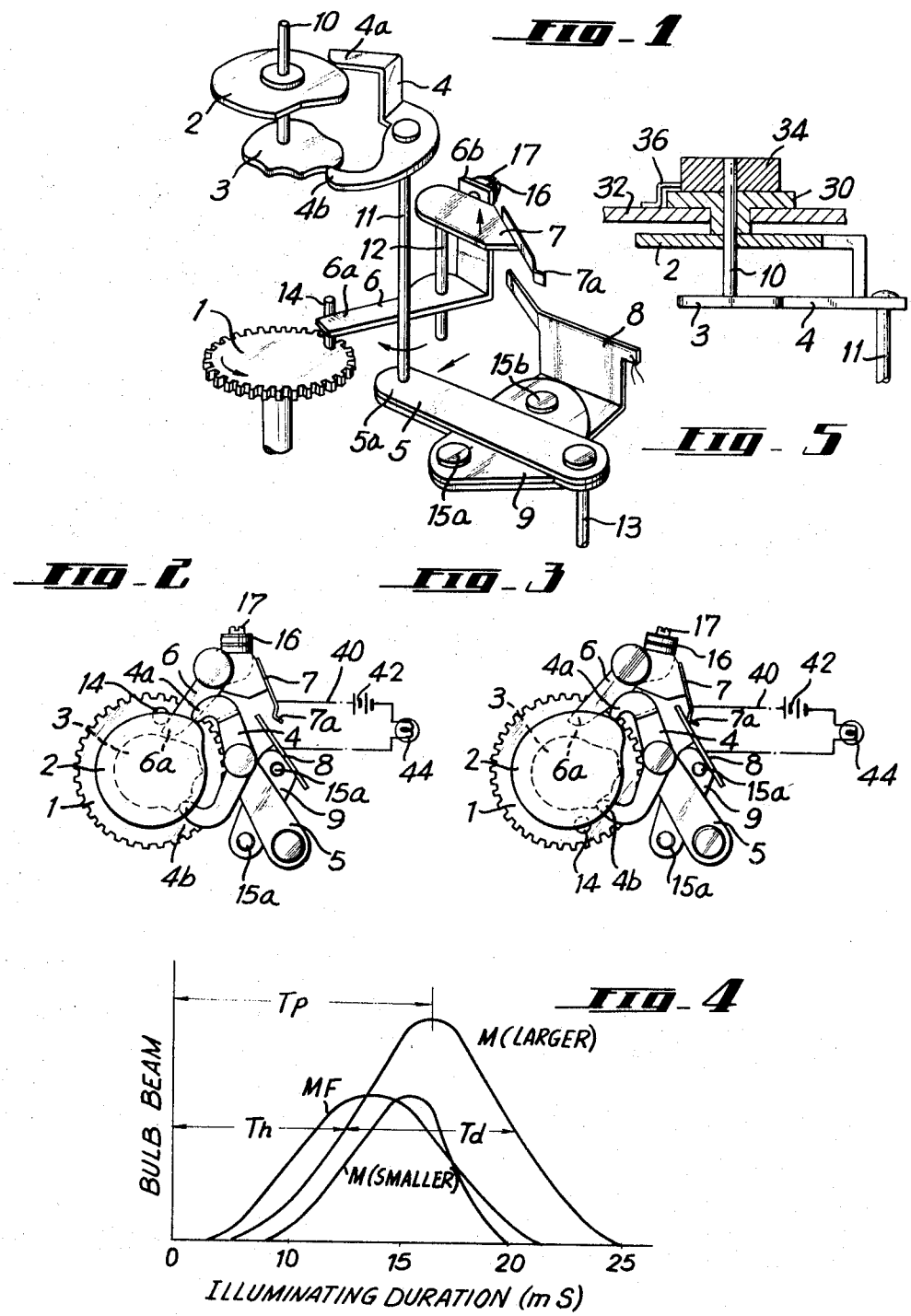

FLASH-SYNCHRONIZING ASSEMBLY FOR CAMERAS

BACKGROUND OF THE INVENTION

The present invention relates to cameras.

In particular, the present invention relates to flash-synchronizing assemblies for cameras.

The invention relates in particular to flash-synchronizing assemblies which are especially suitable for cameras which have focal plane shutters.

In recent times there has been an increased popularity of bulbs of MF and M classes for use with flash synchronizers of cameras having focal plane shutters. The increased use of flash bulbs of this latter type is the result of the advantages flowing from the smaller size of these bulbs, their easier portability, and the greater convenience in handling such bulbs. Thus, it can only be expected that the use of flash of this type will be increased in the future.

Many attempts have already been made to provide flash-synchronizers to be used with this type of flash. However, up to the present time there has been no satisfactory solution to this problem because the particular flash synchronizer of a given camera having a focal plane shutter is limited to only one type of flash. For example a camera may be designed for use with the M class of flash. The result is that the same camera cannot be used with any other type of flash. While there are constructions which do adapt to cameras for use for different types of flash, these constructions are extremely complex since they must take into consideration the fact that there are substantially different time lags among the different types of flash. Thus among the different types of flash which are highly desirable for use with present-day cameras, particularly those which have focal plane shutters, there are the MF class, the smaller M class (e.g.Mx–1), and the larger M class (e.g.Mx–5). The problem of providing simple effective flash-synchronizing structure which will permit the operator of the camera to select any one of these types of flash has not yet been satisfactorily solved.

SUMMARY OF THE INVENTION

It is accordingly a primary object of the present invention to provide a flash-synchronizing assembly which will make it possible for the operator to select from among different types of flash, such as those referred to above, while at the same time maintaining the flash-synchronizing assembly composed of a relatively small number of rugged elements which will operate very reliably to achieve the desired results.

In particular it is an object of the invention to provide a construction of this type which enables the operator to select a predetermined combination of flash type and shutter speed.

The object of the present invention include with the provision of a structure of this type which is not only made up of a small number of rugged parts which operate reliably but which in addition is exceedingly simple and compact so that at a relatively low cost it is possible to provide a structure which will not occupy a large space and which will achieve the desired results in a highly precise manner.

According to the invention, the flash-synchronizing assembly includes a pair of manually operable means one of which is provided for assuming a position corresponding to a given flash type and the other of which is provided for assuming a position corresponding to a selected shutter speed. A positioning means is positioned by both of the manually operable means in a position determined by the combination of the positions selected for the two manually operable means. A switch means which forms part of a flash circuit, for closing the circuit when the switch means closes, is positioned by the positioning means at a position which will provide closing of the circuit at an instant determined by the selected positions of the pair of manually operable means. In this way it becomes possible to achieve for a camera a flash-synchronizing assembly which will provide the best possible instant of ignition of the flash in accordance with the selected type of flash and the selected shutter speed.

BRIEF DESCRIPTION OF DRAWINGS

The invention is illustrated by way of example in the accompanying drawings which form part of this application and in which:

FIG. 1 is a perspective illustration of a flash-synchronizing assembly of the invention;

FIG. 2 is a top plan view of the assembly of FIG.1 showing the structure before the switch closes with FIG.2 schematically illustrating the circuit which will be closed by the switch;

FIG.3 shows the parts of FIG.2 in the position they have when the switch has closed;

FIG.4 is a graph illustrating the different types of flash operation provided by different types of flash; and FIG.5 is a schematic fragmentary sectional elevation showing in more detail how the cams are manually adjusted.

DESCRIPTION OF A PREFERRED EMBODIMENT

In order to illustrate the problems solved by the invention, reference is first made to FIG.4. In FIG.4 there is shown a graph having along its abscissa graduations of illuminating duration in ms. The ordinate of the graph is graduated according to intensity of illumination, so that the greater ordinate distances will correspond to greater light intensities. The three curves are provided for the three different types of flash designated in FIG.4. Thus, for the M (larger) type of flash, the maximum light intensity TP is greater than the maximum light intensities of the other two types of flash. The distance Th along the abscissa indicates the time required for one-half the maximum light intensity to be reached. The duration Td is the time during which the light intensity is greater than one-half of the maximum light intensity. As is clearly apparent from FIG.4, the instants when the maximum light intensity is reached are respectively different for the different types of flash, and moreover the durations Td are different for the several different types of flash, respectively. Also, the times Th when one-half the maximum light intensity is reached is different for the different types of flash.

According to the table presented below, it is particularly important for the synchronizer of the invention to take into consideration the value of Th + ½ Td, so that it will be possible to apply at least one-half, and preferably more of the time during which the light intensity is greater than one-half the maximum light intensity over the entire image plane. With the synchronizing assembly of the invention a mechanism is provided for adjusting any differences in this value to adapt these differences to the different types of flash.

TABLE I

|            | Tp(ms) | Th(ms) | Td(ms) | Th+½Td(ms) |
|------------|--------|--------|--------|------------|
| M F        | 15     | 10     | 15     | 17.5       |
| M(larger)  | 20     | 15     | 15     | 22.5       |
| M(smaller) | 20     | 15     | 10     | 20.0       |

A synchronizing assembly for taking into consideration the above factors is illustrated in FIGS.1–3 and 5. The unillustrated focal plane shutter with which the structure of the invention cooperates is conventional and therefore omitted for the sake of conciseness and clarity. As is well-known, when the shutter is tripped, the leading curtain of the focal plane shutter will be released for movement from its starting to its end position so as to initiate the exposure, and at the end of the exposure time the trailing curtain of the focal plane shutter is released for movement from its starting to its end position so as to close the exposure aperture and terminate the exposure. When the leading curtain of the focal plane shutter is released for movement to initiate the exposure, the train of elements includes an unillustrated pinion which meshes with the rotary gear 1 shown at the lower left of FIG.1. Thus, upon release of the shutter to initiate an exposure this rotary gear 1 will be driven in a counterclockwise direction, as shown by the arrow in FIG.1. Any suitable spring may be provided, for example, to urge the gear 1 to turn in the counter-clockwise direction illustrated in FIG.1. This gear 1 fixedly carried a pin 14 adjacent a periphery of the gear 1 and extending parallel to the axis of rotation thereof for a purpose described below.

The structure of the invention includes a first manually operable means formed by a rotary cam 2 capable of being manually turned to an angular position which will correspond to a selected type of flash. Referring to FIG.5, it will be seen that the rotary cam 2 is fixed with a manually turnable knob 30 which is supported for rotary movement in the bore of a camera wall 32. This wall 32 forms part of the camera housing. The knob 30 will carry an index coacting with a suitable scale on the outer surface of the wall 32 of the camera housing so that the operator can selectively position the knob 30 at a given angular position corresponding to a selected type of flash, such as one of the different types of flash bulb referred to above. This will result in the positioning of the cam 2 of this manually operable means at a corresponding angular position.

A second manually operable means is provided for assuming a selected position corresponding to a given shutter speed. This second manually operable means includes the cam 3 which is fixed to a shaft 10 which extends through an axial bore of the components 30 and 2 which are connected to each other to form a single unit which rotates as one body. The upper end of the shaft 10 fixedly carries a manually turnable knob 34 provided with an index 36 movable along a scale of shutter speeds, so that in this way the second manually operable means is capable of placing the cam 3 at a selected angular position correspondingly to a selected shutter speed.

A positioning means is placed by the pair of manually operable means 2 and 3 in a position determined by the combined selected positions of the pair of manually operable means 2 and 3. This positioning means includes a cam follower 4 having cam-follower end portions 4a and 4b respectively engaging the camming peripheries of the cams 2 and 3. This follower 4 is supported for free swinging movement on a rod 11 which is carried by the free end of a swing-lever 5 of the positioning means. This swing-lever 5 is supported for swinging movement about a shaft 13 which thus determines the stationary axis about which the lever 5 swings. An unillustrated spring urges the lever 5 to turn in a counter-clockwise direction, as viewed in FIG.1, and the free end 5a of the lever 5 carries the rod 11. It is thus apparent that with this construction the positioning means will provide for the swing-lever 5 an angular position in accordance with the selected angular positions of the cams 2 and 3.

The assembly further includes a switch means for closing a flash circuit when the switch means closes, and this switch means 7,8 is placed by the positioning means 4,5 at a position to provide an instant of ignition of the flash which will be proper for the selected shutter speed and flash type. As is indicated in FIGS.2 and 3, the contacts 7 and 8 which form the switch means respectively form part of the schematically represented flash circuit 40 energized from any suitable source 42 and including the schematically illustrated flash bulb 44 which will be of a selected type corresponding to the position provided for the cam 2.

This switch means includes the normally stationary contact 8 and the normally movable contact 7. This normally stationary contact 8 is the contact which has its position adjusted in accordance with the position of the swing lever 5. For this purpose, the contact 8 is secured by rivets 15a and 15b to a plate 9 made of an electrically non-conductive material. This plate 9 is in turn fixed to the swing lever 5. Therefore, when the position of the swing lever 5 changes, the position of the stationary contact 8 changes.

The movable contact 7 of the switch means has a free end 7a which is designed to engage the free end of the normally stationary contact 8. This switch 7 is freely turnable on the top end of a shaft 12 which is stationary. An unillustrated spring urges the contact 7 to turn in a counterclockwise direction, as indicated by the arrow in FIG.1. The shaft 12 also supports for rotation a lever 6 which is urged by an unillustrated spring to rotate in a clockwise direction. However, the free end 6a of the lever 6 is engaged by the pin 14 to prevent the lever 6 from turning in the clockwise direction when the parts are in an initial position as represented in FIGS.1 and 2. The lever 6 has an upstanding portion provided with a threaded bore through which an adjusting screw 17 is threaded, and this adjusting screw 17 carries a lock nut 16 which will hold the adjusting screw 17 in an adjusted position. The free end of the screw 17 engages a part of the switch 7 so that the initial position of the latter is adjusted by way of the screw 17. It will be noted that when the lever 6 turns in a clockwise direction the switch 7 is compelled to turn with the lever 6 as a result of this arrangement.

When the focal plane shutter of the camera is cocked in preparation for making an exposure, the parts will have the position shown in FIG.1. In this position, the spring which acts on the lever 6 seeks to turn the latter in a clockwise direction so as to move the contact 7 into engagement with the contact 8. However, this movement is prevented by the pin 14 which remains stationary with the gear 1 until the shutter is tripped. Before the exposure is made, the operator will of course place a selected flash bulb 44 in its receptacle and the manually operable means 2 will be adjusted according to the selected type of flash. Also the manually adjustable means 3 will be adjusted according to the selected shutter speed. The result is that the follower 4 will be placed in a position determining for the swing lever 5 and the normally stationary contact 8 a position in accordance with the selected combination of shutter speed and flash type.

Referring to FIG.2, upon release of the shutter in order to initiate the exposure the gear 1 will turn in a counter-clockwise direction so that the pin 14 moves toward the left, as viewed in FIG.2, away from the lever 6. Thus, when the shutter-operating plunger or other shutter-tripping mechanism of the camera is actuated, the gear 1 will be released for movement displacing the pin 14 away from the lever 6. As soon as the pin 14 moves beyond the tip 6a of the lever 6, this lever is swung by the unillustrated spring in a clockwise direction so as to bring the movable contact 7 into engagement with the stationary contact 8, as illustrated in FIG.3, and in this way the circuit of the flash 44 is closed, so as to bring about ignition of the flash.

The configuration of the cam 2, and the configuration of the cam 3, are such that for the selected type of flash and the selected shutter speed the normally stationary contact 8 will be placed in a position which will provide an instant of ignition of the flash 44 which is precisely accurate to give the maximum amount of flash illumination for the duration during which the film is exposed. Of course, the illustrated synchro-circuit may include a safety switch interlocked, for example, with the shutter-tripping button.

Thus, in accordance with the invention, the free ends 4a and 4b of the follower 4 respectively engage the cams 2 and 3 for the various classes of bulbs and for the different shutter speeds, respectively. The coaction of these components converts the distance between the contacts 7 and 8 so that the time lag appropriate for the different classes of bulbs and for the different selected shutter speeds is obtained with the extremely simple mechanism of the invention. It is clear from the above description and the drawings that this mechanism is compact, inexpensive, and easily assembled and adjusted.

What is claimed is:

1. In a flash-synchronizing assembly for cameras, first manually operable means for selectively assuming a position corresponding to a selected flash type, second manually operable means for selectively assuming a position corresponding to a selected shutter speed, a positioning means operated by said first and second manually operable means for assuming a position determined by the combined positions of said first and second manually operable means, and switch means forming part of a flash circuit and operatively connected to said positioning means to be positioned thereby at a position for closing the circuit at a given instant determined by the combined positions of said first and second manually operable means, at least one of said manually operable means being in the form of a rotary cam selectively positioned angularly, the other of said manually operable means also being in the form of a rotary cam, said positioning means including a swing-lever turnable about a given axis, a rod extending parallel to and spaced from said axis and turnable with said swing-lever, and a cam follower swingable on said rod and engaging both of said cams for providing for said swing-lever an angular position determined by the combined positions of said cams, said cams having a common axis about which they are angularly positioned, and said common axis being parallel to said rod.

2. The combination of claim 5 and wherein said switch means includes a normally stationary contact and a normally movable contact which moves into engagement with said normally stationary contact for closing the circuit, said swing-lever carrying said normally stationary contact for providing for the latter a position which will determine the instant when the circuit closes.

* * * * *

UNITED STATES PATENT OFFICE
CERTIFICATE OF CORRECTION

Patent No. 3,659,508　　　　　　　　　Dated May 2, 1972

Inventor(s) Fumio Urano

It is certified that error appears in the above-identified patent and that said Letters Patent are hereby corrected as shown below:

In the heading, directly under the line "[22] Filed: May 13, 1970"

insert--[21] Appl.No.: 36,840--.

Signed and sealed this 29th day of August 1972.

(SEAL)
Attest:

EDWARD M. FLETCHER, JR.　　　　　　ROBERT GOTTSCHALK
Attesting Officer　　　　　　　　　　Commissioner of Patents